Patented Apr. 27, 1948

2,440,517

UNITED STATES PATENT OFFICE 2,440,517

COATED MEAT PRODUCT AND PROCESS

Jean N. Lesparre, Chicago, Ill., assignor to Armour and Company, Chicago, Ill., a corporation of Illinois No Drawing. Application June 7, 1943, Serial No. 489,987

8 Claims. (Cl. 99—157)

This invention relates to a coated meat product and the like. More particularly the invention deals with such coated meat products which include a cream type coating, and with methods of preparing and applying such a coating.

An object of the invention is to provide an edible coating composition which possesses desirable taste characteristics and is adapted to be applied to the surface of meat loaf, sausage, and other meat food products. Another object is to provide a coating which at normal atmospheric temperatures is of a plastic consistency and does not become brittle, but at the same time does not flow from the meat portion to which it is applied. Another object is to provide a coating which adheres well to the surface of the meat portion. A further object is to provide a coating which is substantially free from the tendency to mold or turn rancid upon standing for long periods of time. Yet another object is to provide a coating which is light in color and which with the meat portion provides an improved coated product of pleasing appearance.

In the past, it has been common to apply to the meat loaf a coating of animal back fat. In this practice, the back fat is applied in the form of layers or sheets to the surfaces of the meat. However, the back fat cannot be made to adhere to the meat portion as well as would be desired, and it is inclined to turn rancid somewhat easily. Also, this back fat material may be used for other food purposes, and is not always available for the coating of the meat loaves.

It is desirable to have the meat loaves coated since the coating lends protection to the product in marketing and gives it a more pleasing appearance as well as contributing to the taste characteristics.

I have discovered a cream type coating which satisfies the objects expressed herein and which is free from the disadvantages which heretofore have attended the use of back fat in the preparation of the coated meat products.

The coating of the present invention is normally solid at atmospheric temperatures and does not flow from the meat surface to which it is applied. However, the coating, being of the cream type, is somewhat plastic at normal atmospheric temperatures and does not become hard or brittle.

As an illustration of the invention, a coating may be formed of cream and gelatinized starch. The cream constitutes the major portion of the mixture and is intimately admixed with the starch. For example, approximately 100 parts by weight of 18% to 20% cream may be mixed with between 3 and 8 parts of cornstarch. Although other starches, such as potato starch, may be used, corn starch is to be preferred for this purpose.

If desired, milk may be used with a suitable fat and mixed with starch in forming the coating. Either skimmed milk or whole milk may be used, although whole milk is referred to in setting forth herein the proportions of ingredients, including milk. The fat which is used with the milk may be butter fat, lard, or other animal or vegetable fats. In such a mixture, approximately 100 parts of milk may be mixed with between 10 and 25 parts of fat and between 3 and 8 parts of gelatinized starch. For example, 25 pounds of milk may be mixed with 4 pounds of lard and 1 pound of gelantinized cornstarch.

Other suitable or desirable ingredients may be used with the mixture. Thus, sodium citrate or other citrate may be added to the mixture in a slightly acid medium. The acidity may be provided by the use of a small quantity of vinegar. These additional ingredients aid in firming the coating and preventing mold, and also aid in obtaining a light coating with a cheese flavor. Any suitable proportions of the citrate and vinegar may be used. Preferably, these ingredients are used in quantities which are small as compared with the quantities of cream and cornstarch in the mixture.

If desired, a small quantity of ethyl alcohol and a small amount of gelatin may be added to the mixture. In addition, suitable flavoring ingredients and condiments may, if desired, be used.

A specific example of a suitable composition is as follows:

| | | |
|---|---|---|
| Cream (18% to 20%) | pounds | 25 |
| Cornstarch | do | 1 |
| Vinegar (90 grain) | ounces | 6 |
| Sodium citrate | do | ½ |
| Alcohol (190 proof) | do | 5 |
| Gelatin (225 bloom) | pounds | 3 |

Condiments and flavoring ingredients may be added in small quantities as desired.

The composition may be prepared by heating a portion of the cream to a temperature of 212° F. The sodium citrate, vinegar, alcohol, condiments and flavoring ingredients are then added and stirred into the mixture. The cornstarch is separately mixed with a portion of the cream and heated to a temperature of 210° F. The cornstarch solution is then mixed with the cream mixture, and the mass is stirred and then permitted to cool to approximately 150° F. At this latter temperature, the mixture may be stirred and powdered gelatin added to the mixture. The composition is allowed to cool to a suitable temperature, such as 95° F. to 105° F., and a meat loaf may be dipped in the composition to provide a coating thereof.

The invention is particularly applicable to the meat loaf type of product. In the preparation of such product, the ground uncooked meat is mixed with suitable condiments and is cooked in a pan or mold. The cooked loaf may then be dipped in my special coating composition as above described.

If desired, a plurality of layers of the coating composition may be applied to the meat loaf. Preferably, the loaf is dipped in the composition which is at a temperature of 100° F. to 105° F., and then again in the composition at a temperature of 95° F. to 100° F. A thicker coating may be obtained by additional dippings. Another method of applying the composition is to fill the coating composition into pans and cool to make a brick, and then cut slices of the desired thickness for application to the loaf. About 1/8 inch thickness has been found satisfactory. The loaf to which the composition is to be applied may be heated to approximately 105° F. and dipped in hot gelatin, and the thin layers of the coating composition may be applied to the loaf. If desired, the loaf may be placed in a mold lined with paper, and after the coating composition layers are applied, the mass may be pressed and dipped in water at a temperature of 150° F. for approximately ten seconds and afterwards placed in a cooler for chilling.

By describing the coating composition as of the cream type, the characteristics of the composition as to consistency are referred to rather than the fact that the composition may contain cream. The coating adheres well to the surface of the meat and is comparatively free of mold. The composition is light in color and has a pleasing and desirable taste.

Although the invention has been described in connection with a specific embodiment, it will be apparent that modifications and changes may be made without departing from the spirit and scope of the invention.

I claim:

1. A coated meat product comprising an interior body portion of cooked comminuted meat and an exterior covering adhering tightly to the surface of said body portion, said covering including a mixture containing approximately 100 parts of milk, between 10 and 25 parts of fat, and between 3 and 8 parts of gelatinized starch, all of the proportions being by weight, the covering being substantially solid at normal atmospheric temperatures.

2. A coated meat product adapted to remain free of mold and rancidity for long periods of time, comprising an interior body portion of cooked comminuted meat and an exterior covering adhering tightly to the surface of said body portion, said covering including an intimate mixture of cream, gelatinized starch and a citrate, the mixture being slightly acid and being substantially solid at normal atmospheric temperatures.

3. A coated meat product comprising an interior body portion of cooked comminuted meat and an exterior layer which is a mixture of cream, gelatinized starch, gelatin, a citrate and alcohol, said interior layer being in close adherence with the surface of said body portion.

4. An edible coating adapted to adhere to the surface of meat food products and the like, comprising an intimate mixture of a major proportion of cream, a minor proportion of gelatinized starch, a small quantity of a water-soluble citrate salt, and a small quantity of alcohol, said mixture being solid at normal atmospheric temperatures and remaining free of mold and rancidity for long periods of time.

5. An edible coating as set forth in claim 4 wherein the mixture includes a small quantity of gelatin.

6. A method of preparing and applying an edible coating composition, comprising mixing cream and starch together, heating the mixture to a temperature in the neighborhood of 212° F. to gelatinize the starch, cooling the mixture to a temperature in the neighborhood of 95° F. to 105° F., and dipping in the mixture a meat food product to form on the surface of the product a layer of the coating composition.

7. A method of preparing and applying an edible coating composition, comprising mixing together a major proportion of cream, a minor proportion of cornstarch, a small quantity of sodium citrate, a small quantity of alcohol, a small quantity of vinegar, and a small quantity of gelatin, heating the mixture to a temperature in the neighborhood of 212° F. to gelatinize the starch and intimately mix the constituents of the mixture, cooling the mixture to a temperature in the neighborhood of 95° F. to 105° F., and dipping in the mixture a meat food product to apply to the surface of the product a layer of the coating composition.

8. A coated meat product comprising an interior body portion of cooked comminuted meat and an exterior covering adhering tightly to the surface of said body portion, said covering including a mixture containing approximately one hundred parts of about eighteen percent to twenty percent cream, and about from three to eight parts of gelatinized starch, the proportions being by weight, the covering being substantially solid at normal atmospheric temperatures.

JEAN N. LESPARRE.

REFERENCES CITED

The following references are of record in the file of this patent:

UNITED STATES PATENTS

| Number | Name | Date |
|---|---|---|
| 711,990 | Markovits et al. | Oct. 28, 1902 |
| 1,009,650 | Delius et al. | Nov. 21, 1911 |
| 2,029,248 | Musher | Jan. 28, 1936 |
| 2,161,029 | Eckrich et al. | June 6, 1939 |

FOREIGN PATENTS

| Number | Country | Date |
|---|---|---|
| 148 | Great Britain | Jan. 18, 1870 |
| 1,373 | Great Britain | May 6, 1872 |
| 2,620 | Great Britain | Nov. 15, 1890 |
| 15,790 | Great Britain | Mar. 18, 1904 |

OTHER REFERENCES

The Boston Cooking-School Cook Book, by F. M. Farmer published 1922, by Little, Brown & Co. Boston, Mass., pages 265, 266, and 267.